United States Patent
Dorenbaum

(10) Patent No.: US 7,850,076 B1
(45) Date of Patent: Dec. 14, 2010

(54) CASH MANAGEMENT SYSTEM

(76) Inventor: Andrei Dorenbaum, 7040 Pasadena, Dallas, TX (US) 95214

( * ) Notice: Subject to any disclaimer, the term of this patent is extended or adjusted under 35 U.S.C. 154(b) by 0 days.

(21) Appl. No.: 12/579,280

(22) Filed: Oct. 14, 2009

Related U.S. Application Data

(62) Division of application No. 11/379,700, filed on Apr. 21, 2006, now abandoned.

(51) Int. Cl.
*G06K 7/08* (2006.01)
*G06Q 40/00* (2006.01)
*G07D 11/00* (2006.01)
*G07F 19/00* (2006.01)
*E04H 9/00* (2006.01)
*E05G 1/04* (2006.01)
*E05G 1/00* (2006.01)

(52) U.S. Cl. .......................... 235/381; 235/379; 109/2; 109/53; 109/56

(58) Field of Classification Search ................. 235/381, 235/379; 109/2, 52, 53, 56; 221/129; 340/10.31, 340/5.9
See application file for complete search history.

(56) References Cited

U.S. PATENT DOCUMENTS

| | | | |
|---|---|---|---|
| 1,383,443 A | | 7/1921 | Szymkiewicz |
| 3,512,679 A | * | 5/1970 | Stoltz ...................... 221/129 |
| 4,312,277 A | | 1/1982 | Graef et al. |
| 4,884,514 A | * | 12/1989 | Shockey et al. ............ 109/2 |
| 4,913,341 A | | 4/1990 | Bachman |
| 4,922,837 A | | 5/1990 | McGunn |
| 5,035,187 A | | 7/1991 | McGunn |
| 5,161,736 A | | 11/1992 | Roccoberton et al. |
| 5,209,335 A | | 5/1993 | Shuren et al. |
| 5,209,395 A | | 5/1993 | Zouzoulas et al. |
| 5,252,811 A | | 10/1993 | Henochwicz |
| 5,291,003 A | * | 3/1994 | Avnet et al. ................. 235/381 |
| 5,295,196 A | | 3/1994 | Raterman et al. |
| 5,438,523 A | * | 8/1995 | Humm et al. ................ 340/5.9 |
| 5,538,122 A | | 7/1996 | Siemens |
| 5,553,320 A | | 9/1996 | Matsuura et al. |
| 5,725,081 A | * | 3/1998 | Meeker ....................... 109/53 |
| 5,813,510 A | * | 9/1998 | Rademacher ............... 235/379 |
| 5,870,487 A | | 2/1999 | Graves et al. |
| 5,875,259 A | | 2/1999 | Mennie et al. |
| 5,883,371 A | | 3/1999 | Meeker |
| 6,067,530 A | | 5/2000 | Brooks, Jr. et al. |
| 6,323,782 B1 | * | 11/2001 | Stephens et al. ......... 340/10.31 |
| 6,637,576 B1 | | 10/2003 | Jones et al. |
| 6,659,340 B2 | | 12/2003 | Siemens |
| 6,724,303 B2 | | 4/2004 | McGunn et al. |
| 6,726,100 B2 | | 4/2004 | Lauper et al. |
| 6,981,633 B2 | | 1/2006 | Inoue et al. |
| 6,983,836 B2 | | 1/2006 | Adams et al. |
| 7,063,252 B2 | * | 6/2006 | Smith et al. ................. 235/379 |
| 7,264,150 B1 | * | 9/2007 | Moreland et al. ........... 235/379 |

(Continued)

*Primary Examiner*—Thien M. Le
*Assistant Examiner*—Thien T Mai
(74) *Attorney, Agent, or Firm*—Law Office of Karen Dana Oster, LLC

(57) ABSTRACT

An apparatus and method for managing cash utilize one or more remotely or locally operable cash management devices. A cash management device dispenses cash, determines the denomination and amount of deposited cash and remotely or locally reconciles a cashier cash drawer at the end of a shift. The cash is accounted for from the time it is disbursed from a cash management device, throughout a cashier's sales and when it is deposited into the cash management device.

27 Claims, 9 Drawing Sheets

U.S. PATENT DOCUMENTS

| | | | | |
|---|---|---|---|---|
| 2001/0032118 A1* | 10/2001 | Carter | | 109/56 |
| 2001/0054643 A1* | 12/2001 | Siemens | | 235/379 |
| 2004/0134980 A1* | 7/2004 | Flood et al. | | 235/381 |
| 2006/0065717 A1 | 3/2006 | Hurwitz et al. | | |
| 2006/0129484 A1 | 6/2006 | Hurwitz et al. | | |

* cited by examiner

CASH MANAGEMENT SYSTEM

The present application is a divisional of U.S. patent application Ser. No. 11/379,700 filed Apr. 21, 2006. The present application is based on and claims priority from this application, the disclosure of which is hereby expressly incorporated herein by reference in its entirety.

BACKGROUND OF INVENTION

The present invention relates to cash management apparatuses and systems, and particularly to apparatuses and systems for real-time cash dispensing, tracking, and auditing cash in one or more locations from a central location, remote location, or locally.

In most store and financial institution locations handling currency and/or coin ("cash"), a trusted manager dispenses cash to cashiers from a central safe at the start of and during a shift. In addition, a manager counts cash received from each cashier at the end of a shift. The manager reconciles the difference in cash between the start and end of a shift with the sales reported by the cashier's software-based point of sale system ("POS"). This process of controlling cash is summarized by the following steps: (1) manager opens safe; (2) manager counts cash to dispense to a cashier; (3) manager records cash amount dispensed to cashier and placed in cashier's POS; (4) cashier verifies cash amount by counting distributed cash; (5) steps 1-4 are repeated if cashier requires additional cash disbursements throughout shift; (6) at the end of shift, cashier counts cash from POS and remits to manager; (7) manager counts end-of-shift cash and enters closing cash balance into cashier's POS; (8) sales report is run on cashier's POS to verify end of shift cash count is correct for total amount of cash disbursed to cashier plus cashier's sales; and (9) manager places cash in safe and closes safe.

In addition, a local manager is required to oversee deposits into the safe from a bank, as well as withdrawals from the safe to a bank. A manager must be present to open the safe during such transactions, or an armored car service must be granted access to the safe.

Disadvantages of the manual cash management process described above include duplicate cash counting by the manager and the cashier, the need to have a manager in each location where cash is handled, manual (versus mechanical) cash counting and dispensing, and a lack of real-time information about a cashier's sales throughout a shift.

Cash management systems have been developed to reduce the number of steps for handling cash. Common systems automate cash counting and depositing cash into a safe or a removable canister within a safe. Other systems combine automated cash verification and depositing into a safe with an end-of-shift report that reconciles the deposited cash with a cashier's sales, while other systems focus on collecting cash, collecting cash and providing change, i.e., disbursing an equivalent cash amount in different denominations, or collecting and/or disbursing cash.

Exemplary systems for counting cash and depositing cash into a safe are described in U.S. Pat. Nos. 5,538,122 (Siemens) and 6,659,340 (Siemens). Each of these systems provides automated cash counting and correlates a cash deposit to a particular cashier. Counted cash is automatically deposited into a safe through an opening in the safe covered by the cash counting device. Deposit reports are generated, and can be transmitted from a safe to an electronic network where the deposit information may be viewed remotely and used to verify that cash from a particular safe is deposited into a bank.

An exemplary system for automatically verifying cash deposited into a safe with an end-of-shift report reconciling the deposited cash with a cashier's sales is described in U.S. Pat. No. 6,067,530 (Brooks, Jr. et al.). In this system, each cashier station has a small deposit safe located within easy reach so a cashier does not need to leave a cash register unattended, or a single safe is located close to several cashiers. A cashier deposits cash into a safe, either during a shift or at the end of a shift, and the cash is correlated to the particular cashier as well as automatically counted by a device located within the safe. The electronics in the safe communicate with a central computer which also communicates with each cashier's POS, and are used to generate end-of-shift reports that reconcile the deposited cash with the cashier's sales.

One system for collecting cash, making change, and disbursing cash is described in U.S. Pat. No. 5,883,371 (Meeker). There is disclosed a device with a bill receiver for validating bills of various denominations and for signaling the denomination of each bill. When making change, a cash dispenser dispenses cartridges containing units of cash one at a time in response to the bill denomination signal. An electronic cash control system is mounted within the safe and includes software for recording each deposit into the bill receiver, recording each withdrawal from the cash dispenser, and providing detailed reports of all such transactions. The cash control system can also be programmed to dispense a certain amount of cash under specified conditions without the deposit of cash.

Another configuration for collecting cash, making change, and disbursing cash utilizes a mechanism called a recycler. For example, Hitachi-Omron manufactures a number of safes for commercial use, including a recycler US-ABIO. Also, Glory LLC manufactures a commercially available recycler. De La Rue manufactures a number of safes for commercial use, including a recycler TCR Twin Safe.

A recycler is able to both dispense notes and count notes in the same mechanism. Notes deposited in the recycler are later available for dispensing, without reloading or moving cassettes in the machine. An example of such a recycler is described in U.S. Pat. No. 6,637,576 (Jones et al.) where deposited bills and coins are counted and separated according to denomination. The deposited bills and coins are available for disbursement to users either as change or as a withdrawal. Another such system is described in U.S. Pat. No. 5,553,320 (Matsuura et al.). Both of these systems account for cash loaded into the system, deposited into the system and withdrawn from the system, but are not configured to account for sales transactions. Safes incorporating recyclers are manufactured by Hitachi-Omron, which uses a recycler US-ABIO, and De La Rue, which uses a recycler TCR Twin Safe.

One disadvantage with current automated cash management systems is that they use safes which have several disadvantages in terms of security. A safe is typically rated based on its ability to withstand fire and theft. The ability to withstand either of these factors is determined by the wall thickness of the safe and the remaining openings in the safe when the main door is closed. Present cash management systems have openings in the safe wall to accommodate the intake and output of cash. None of the safes have a high security rating, typically designated by a Uniform Laboratories ("UL") standard of tool-resistant to 15 minutes of theft attack ("TL-15"). Present cash management systems therefore require a manager to transfer cash between a high security safe and the cash management system, or to have a courier, such as an armored car, pick up and deliver cash on a daily basis, both of which decrease cash security and incur additional costs.

Nearly all third-party underwriters refuse to insure large amounts of cash stored in non TL-15 or better safes during non business hours. As a result, stores utilizing cash management systems with lower grade safes must either self-insure or have a manager move cash out of a high security safe and into the cash management system at the start of a business day and back into the high security safe at the end of the business day. Some current cash management systems utilize safes with a UL-291 rating which is similar to a TL-15 rating. However, the price of a UL-291 safe is significantly more than a TL-15 rated safe. In addition, some insurance companies will not provide the same coverage for a UL-291 safe as they will for a TL-15 safe. Using a UL-291 safe therefore imposes unnecessary cost and risk for a business.

Another disadvantage with current automated cash management systems is that they are not capable of autonomous operations without the intervention of an on-site manager. With present systems, an on-site manager must transfer cash between the automated cash management system and the overnight safe at the start and end of the business day. Also, an on-site manager is required to disburse or accept deposits of cash unless an on-site cashier is granted the permission to perform these functions beforehand.

Many present systems are configured to dispense only pre-determined cash amounts and require specialized containers which must be loaded into the system. Some of these systems are the Model SC3221 manufactured by the McGunn Safe Company, NKL Cash Handling's Intellisafe and other systems, Armor Safe Company's safes, including CacheSYSTEM 7000, and Tidel's Sentinel safe. The present systems do not allow a remote manager to determine in real time the amount of cash to dispense to a cashier, nor do they allow a remote manager to control in real time the deposit of cash by a cashier. Real-time remote supervision would allow businesses to reduce the number of managers needed to manage cash, and decrease losses related to cash handling.

The above systems store coin/currency tubes in vertical shafts, with each shaft representing a different denomination. A typical machine may have ten shafts with ten tubes each for a total of one hundred tubes. If a cashier wants quarters, a tube containing a roll of quarters will dispense. In some cases, rolled currency notes are inserted into tubes to allow for rolled currency dispensing. These dispensing systems have several limitations which prevent them from being used for real-time, secure cash disbursements in a retail or similar cash handling environment. The limitations are: (1) time-consuming loading because currency has to be rolled and stored in separate tubes; (2) limited supply of cash for disbursing which must be manually replaced, making the systems unaccommodating for businesses requiring large amounts of cash, such as grocery stores or check cashing businesses; and (3) limited flexibility for disbursing various amounts of cash due to pre-loaded tubes.

All of the foregoing cash management systems can be purchased with different note capacity options. However, none of the cash management systems are scalable. More specifically, if a user requires additional capacity from a cash management system, the user cannot upgrade that capacity. Instead, the user must purchase a new cash management system. Likewise, if a user has a cash management system that incorporates a bill vending machine, current cash management systems do not permit the user to swap the bill vending hardware for recycler hardware. This limitation is due to the fact that the safe that contains the hardware can only mount one type of hardware. The foregoing limitations in terms of scalability and swapping of hardware impose expenses on the user when upgrading the cash management system.

Another disadvantage with current cash management systems is that they require user access to the inner safe compartments in order to clear a note jam. This allows a user access to the currency and/or coin stored in the device, thereby increasing the risk of theft or loss.

BRIEF SUMMARY OF THE INVENTION

There is a need for a cash management system with a high level of security. There is also a need for a cash management system that permits secure, real-time cash disbursements by an on-site or remote manager. There is a further need for a cash management system that is easily scalable, and a need for a cash management system that provides limited, select access to cash.

These needs and others are met by embodiments of the present invention, which provides an apparatus and method for managing cash. A low security safe has three compartments: a first internal compartment, a second internal compartment and a third internal compartment. The low security safe is configured to fit within a high security safe and has an aperture through one of its walls. There are three doors attached to the low security safe: a first door prevents access to the first compartment when closed and provides access to the first compartment when open; a second door prevents access to the second compartment when closed and provides access to the second compartment when open; and a third door prevents access to the third compartment when closed and provides access to the third compartment when open. The second and third doors have apertures into the second and third compartments, respectively, to allow communication with the outside of the low security safe when the second and third doors, respectively, are closed. Each door contains a lock that is separately operable, thereby permitting one door to be opened while the remaining two are locked. A processor is contained within the first chamber, and has a data connection that can be wireless or wired. A power supply is also contained within the first chamber, and has a power connection that passes through the aperture in the low security safe wall. A cash handling device is mounted in the second chamber, is connected to the power supply and to the processor, and is mounted to have a portion protrude through the aperture in the second door when the second door is closed. A cash dispensing device is contained in the third chamber, is connected to the power supply and to the processor, and is configured to have a portion protrude through the aperture in the third door when the third door is closed. A moveable shelf in the third chamber is configured to move to a position that permits the portion of the cash dispensing device to protrude through the aperture in the third door when the third door is closed.

Embodiments of the present invention overcome the difficulty of communicating with an external processor through the high security safe wall, without the need to drill holes that are larger than those permitted for a TL-15 rated safe. This is accomplished by converting the standard digital signal from most commercially available currency handling equipment into a protocol that can be transmitted over Ethernet or wirelessly. This is accomplished with commercially available hardware. Such Ethernet cable can be installed in the field by passing it through standard alarm holes drilled in the back of most high security safes that are consistent with the TL-15 ratings for such safes.

The present invention improves upon prior devices by utilizing a commercially available high capacity cassette-type cash dispenser alongside a commercially available high capacity bulk note counting device. Unlike prior art devices, the present invention is capable of both receiving large quantities of cash as well as dispensing large quantities of cash without requiring daily transfer of cash to and from the present invention. The high capacity cassette-type dispenser can dispense up to six different denominations and can dispense any number of notes in such denominations. The cash tube dispensing systems lack these advantages. In addition, the high capacity cassette-type cash dispenser can be loaded more quickly and with fewer errors because the user simply loads six cassettes, each with a large stack of bills. In the case of the tube dispenser, the user must separately count, roll, and load up to one hundred tubes.

The high capacity bulk note counting device allows the user to deposit notes more quickly than with a single note validating device found in other units. The bulk note counting device can accept a stack of notes for processing, thereby reducing the time required to close a shift.

As an alternative to the high capacity bulk note counting device, the present invention utilizes a commercially available recycler that both counts cash and dispenses cash from the same cassettes. By including a large capacity note dispenser as described above alongside the recycler, the present invention overcomes the low note-dispensing capacity of standalone inexpensive recyclers. In addition, the recycler allows users to dispense cash deposited the night before at the start of the next day's shift. This recycling feature reduces the frequency for reloading cash.

The present invention overcomes the inability of prior art to allow the user to increase the cash storage capacity of the cash management system. The present invention allows the user to increase the capacity of the cash note dispensing device by locating it on a vertically adjustable shelf. The user can purchase additional commercially available cassettes for the cash note dispensing device that attach to the bottom of the cash note dispensing device. As the additional cassettes are attached to the bottom of the cash note dispensing device, the shelf on which such device is located is moved vertically to a lower position. This allows the cash dispensing portion of the device to remain at a constant height and fit through the opening in the door of the low security safe.

The present invention overcomes the inability of prior art to allow the user to change the currency handling devices inside the low security safe to different types of commercially available currency handling units. The adjustable shelf described above allows the user to change the cash dispensing device to a different cash dispensing device. The two devices may have different vertical measurements and the shelf can be adjusted to accommodate this difference. In a similar manner, the high capacity bulk note counting device can also be replaced with a commercially available recycler device. The high capacity bulk note counting device is attached to a flat vertical bracket that attaches to the interior of the low security safe. The bracket can be replaced with a bracket that is compatible for mounting the recycler device.

The present invention overcomes the inability of prior art to allow the user to clear currency note jams in the device without the need to open the safe door to expose the cash cassettes. The small opening in the low security door in this invention allows the user to remove the top portion of the commercially available high capacity bulk note counting device through such an opening without opening the door. The user is then able to clear the note jam contained in the top portion of the high capacity bulk note counting device that was removed from the safe.

The present invention's multi-door low security safe overcomes security issues with single-door safes used in prior art. The multi-door system allows a manager to locally or remotely grant access to only one portion of the safe's cash cassettes. For example, a user may be granted access only to the door that accesses the cassette for the high capacity bulk note counting device.

The present invention includes the ability to remotely control the dispensing and counting of cash from a disparate location. Prior art lacks the ability to allow a manager to control dispensing of cash to multiple remote locations. Likewise, prior art lacks the ability to report to the manager in real time the amount of cash deposited into the cash management system at multiple remote locations and aggregate such information (reporting is done on a batch file end-of-day basis rather than a real-time streaming basis). Prior art also lacks the ability to network multiple cash management systems for the purpose of central control of dispensing, counting and reporting.

Another aspect of the present invention relates to a method for automatically balancing a cashier's drawer. The method comprises the steps of dispensing an amount of cash to a cashier from a cash management system and storing in the cash management system data representing the amount of cash dispensed to the cashier. The method also comprises the steps of receiving sales data from a cashier's point of sale system into the cash management system; calculating an amount of cash in a cashier's drawer based upon the data representing the amount of cash dispensed and the sales data; and receiving deposited cash from the cashier into the cash management system. Further steps include counting the deposited cash by the cash management system; comparing the deposited cash counted to the calculated amount of cash to determine whether all of the cash from the cashier's drawer was deposited into the cash management system; and making the results of comparing the deposited cash counted to the calculated amount of cash immediately available. Such results are in the form of a report which is transmitted from the cash management system to a manager's computer system in certain embodiments.

Another aspect of the present invention adds further steps to the method for automatically balancing a cashier's drawer described above. These steps include receiving into the cash management system cashier identifying information from a trusted source, and receiving into the cash management system cashier identifying information from a cashier before the step of dispensing an amount of cash. The method also comprises the steps of correlating the dispensed amount of cash to a particular cashier based upon the cashier identifying information received from the cashier, and modifying the step of receiving sales data from a cashier's point of sale system into the cash management system to further include information correlating the sales data to the cashier identifying information. Additional steps comprise receiving cashier identifying information from a cashier before the step of automatically counting the deposited cash, and correlating the counted deposited cash to a particular cashier based upon the cashier identifying information received before the step of automatically counting the deposited cash. The step of comparing further involves comparing the correlated counted deposited cash to the calculated amount of cash based upon the cashier identifying information to determine whether all of the cash from the cashier's drawer was deposited into the cash management system.

Additional advantages and novel features of the invention will be set forth in part by the description which follows, and in part will become apparent to those skilled in the art upon examination of the following or may be learned by practice of the invention. The advantages of the invention may be realized and attained by the instrumentalities and combinations, particularly pointed out in the appended claims.

BRIEF DESCRIPTION OF THE SEVERAL VIEWS OF THE DRAWINGS

The present invention is illustrated by way of example, and not by way of limitation in the figures of the accompanying drawings in which like reference numerals refer to similar elements and in which.

DETAILED DESCRIPTION OF THE INVENTION

The present invention addresses and solves problems related to automated cash management systems, particularly where current systems do not permit real-time, remote, secure cash disbursement. The present invention also addresses and solves problems related to securely storing cash in a cash management system. The present invention also addresses and solves problems related to cash management scalability, security for clearing note jams and real-time cashier cash deposit reconciliation. This is achieved by providing an apparatus and method for securely storing cash, disbursing cash, receiving and accounting for cash, and real-time cash reconciliation.

The present invention makes remote, automated cash management possible with a high level of security and real-time cash accountability.

Figure 1:
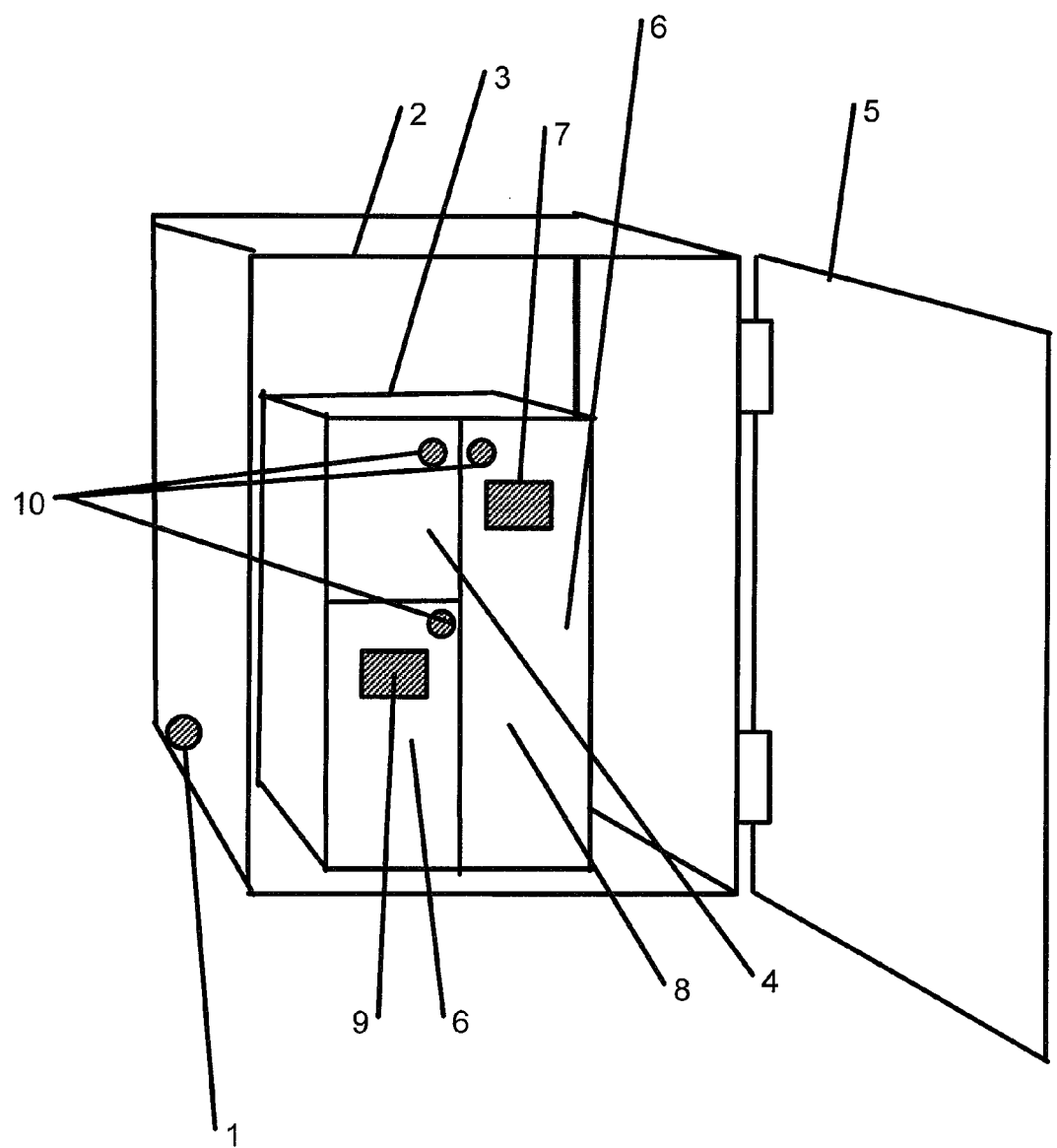
FIG. 1 is a front perspective schematic view of the preferred embodiment of the invention.

Referring now to the drawings, and initially to FIG. 1, an apparatus for secure, automated, remote cash management is described. A high security safe 2, for example, a safe with a TL-15 designation such as the TL-15 High Security Safe PR181412 manufactured by ISM, contains an alarm aperture 1 as is well known in the art. An internal low security safe 3 is anchored within the high security safe 2. The internal low security safe 3 is configured for installation into a high security safe 2, and is sized to fit within various high security safes 2. The internal low security safe 3 has three doors: processor and power supply door 4, cash handling device door 6 and cash dispensing device door 8, each with a separate lock 10. The locks may be manually operated, or controlled by a processor contained within or external to the internal low security safe 3, as is well known in the art.

Figure 2:
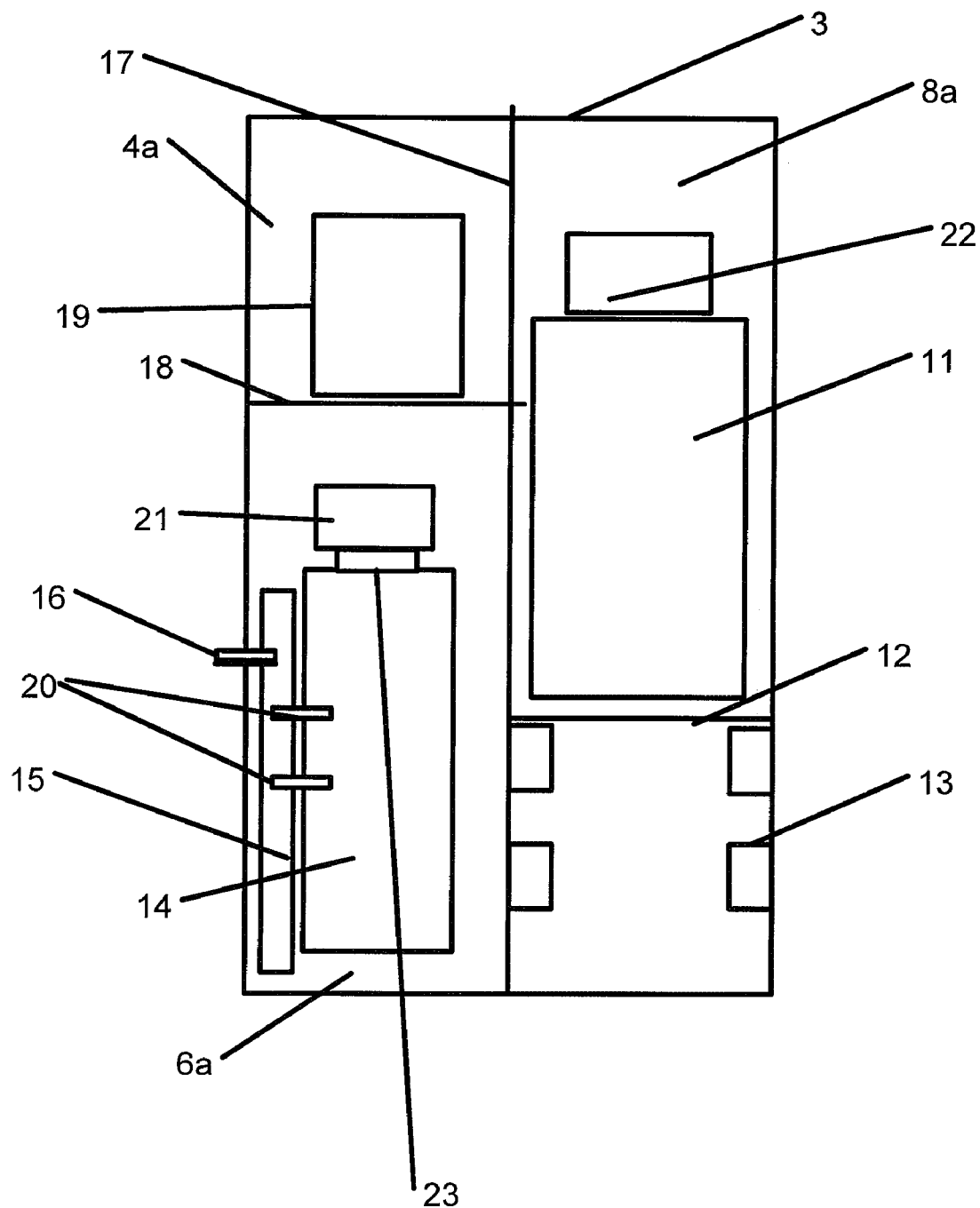
FIG. 2 is a front two-dimensional schematic view of the embodiment of FIG. 1 without the exterior safe 2 in FIG. 1 and with the doors 4, 6, 8 on the interior safe 3 removed.

The compartment behind processor and power supply door 4 contains a processor and power supply for the present invention. The compartment behind cash handling device door 6 contains a cash handling device, for example a cash counting device or a recycler device. Cash counting devices and recycler devices are well known in the art. Exemplary cash counting and recycling devices are described in U.S. Pat. Nos. 5,295,196; 5,870,487; 5,875,259; 5,209,395; and 5,553,320 all of which are herein incorporated by reference in their entireties. Cash handling device door 6 has an opening 9 to permit cash to be fed to a cash handling device 14 (FIG. 2). The compartment behind cash dispensing device door 8 contains a cash dispensing device 11 (FIG. 2). Cash dispensing device door 8 has an opening 7 to permit collecting cash dispensed by the cash dispensing device 11.

Referring now to FIG. 2, compartments within internal low security safe 3 for the preferred embodiment of the present invention are described. A central vertical wall 17 divides the left and right side of low security safe 3. The processor 31 and power supply 32 (FIG. 5) are contained in housing 19 on shelf 18 which defines the lowest portion of compartment 4*a* in the internal low security safe 3. Shelf 18 also defines the uppermost portion of compartment 6*a*. Processor and power supply door 4 is used to grant access to compartment 4*a*. As is well known in the art, processor 31 may be any hardware and/or software combination suitable for processing financial transactions and/or controlling hardware such as locks 10. Power supply 32 may be a conventional power supply, an uninterruptible power supply, battery backed-up power supply or other power supply as is well known in the art.

A cash handling device 14, for example a cash counting device or a recycler device, is contained in a separate compartment 6*a*. Cash handling device door 6 is used to grant access to compartment 6*a*. The cash handling device 14 is connected to a currency note intake device 21, as is well known in the art. In the preferred embodiment, the currency intake device 21 is capable of receiving multiple currency notes at once as is well known in the art. Currency device 21 can also be a single note receiving device, also well known in the art. Exemplary currency receiving devices are the WBA series of note acceptors manufactured by JCM, Lobby90 by Giesecke & Devrient GmbH, and LBCI by Kabe. The currency note intake device 21 is removable through opening 9 in cash handling device door 6 by pulling on a release lever 23 which is well known in the art. Release lever 23 is accessible through opening 9, making it possible to remove currency note intake device 21 to clear note jams without unlocking and opening cash handling device door 6. As is well understood in the art, cash in the currency note intake device 21 is stored in a locked container within the currency note intake device 21. This container cannot be accessed by removing the currency note intake device 21. Cash handling device door 6 also has protective square metal guards 27 (FIG. 4) which extend outward from the face of cash handling device door 6 on either side of currency note intake device 21. Metal guards 27 provide physical protection for the currency note intake device 21.

Cash handling device 14 is mounted to a bracket 15 with fasteners 20. Fasteners 20 can be screws or any other suitable securing device permitting exchanging bracket 15 with other brackets. The bracket 15 is mounted to a wall inside low security safe 3 with suitable fastener 16, such as a screw or other suitable securing device. The bracket 15 is replaceable in order to accommodate mounting different types of cash handling devices 14.

Cash dispensing device 11 is contained in compartment 8a which is defined by internal wall 17 and the left wall of the low security safe 3. Cash dispensing device door 8 is used to grant access to compartment 8a. A cash dispenser 11 rests on or is mounted to an adjustable shelf 12. In the preferred embodiment, adjustable shelf 12 is moveable between various brackets 13 mounted to the walls of chamber 8a. Adjustable shelf 12 can be mounted in any manner that provides vertical positioning such as on a rack and pinion, hydraulic system, etc. Moving adjustable shelf 12 permits compartment 8a to accommodate cash dispensing devices 11 of varying vertical heights while retaining access to cash dispensed by cash dispensing devices 11 through opening 7. It also permits additional cash canisters to be added to increase the capacity of cash dispensing device 11 without replacing cash dispensing device 11. Currency notes dispensed from the note dispensing head 22 of the cash dispensing device 11 are accessible through aperture 7 in door 8. The note dispensing head 22 is removable through aperture 7 in door 8 depending on the model of the cash dispensing device 11 mounted in the low security safe 3.

Separate compartments 4a, 6a and 8a permit access to select portions of internal low security safe 3 on an individual basis. Such select access makes it possible for the processor 31 or power supply 32 to be serviced or repaired without exposing any of the cash contained in the cash handling device 14 or cash dispensing device 11. Likewise, if the cash handling device 14 or the cash dispensing device 11 needs repair, cash reloaded or removed, access can be given to the specific compartment 6a or 8a without exposing the cash contained in the other device. Select access to each of the compartments 4a, 6a and 8a is possible due to the individual processor and power supply door 4, cash handling device door 6 and cash dispensing device door 8 which each contain an independent lock. As described later in conjunction with FIG. 7, because processor 31 is networked it is possible for a manager to grant access to each select compartment 4a, 6a or 8a from a remote location at a specific time. This permits the cash management system of the present invention to be repaired, have cash loaded or have cash removed for deposit in a bank in a secure, efficient manner.

Figure 3:
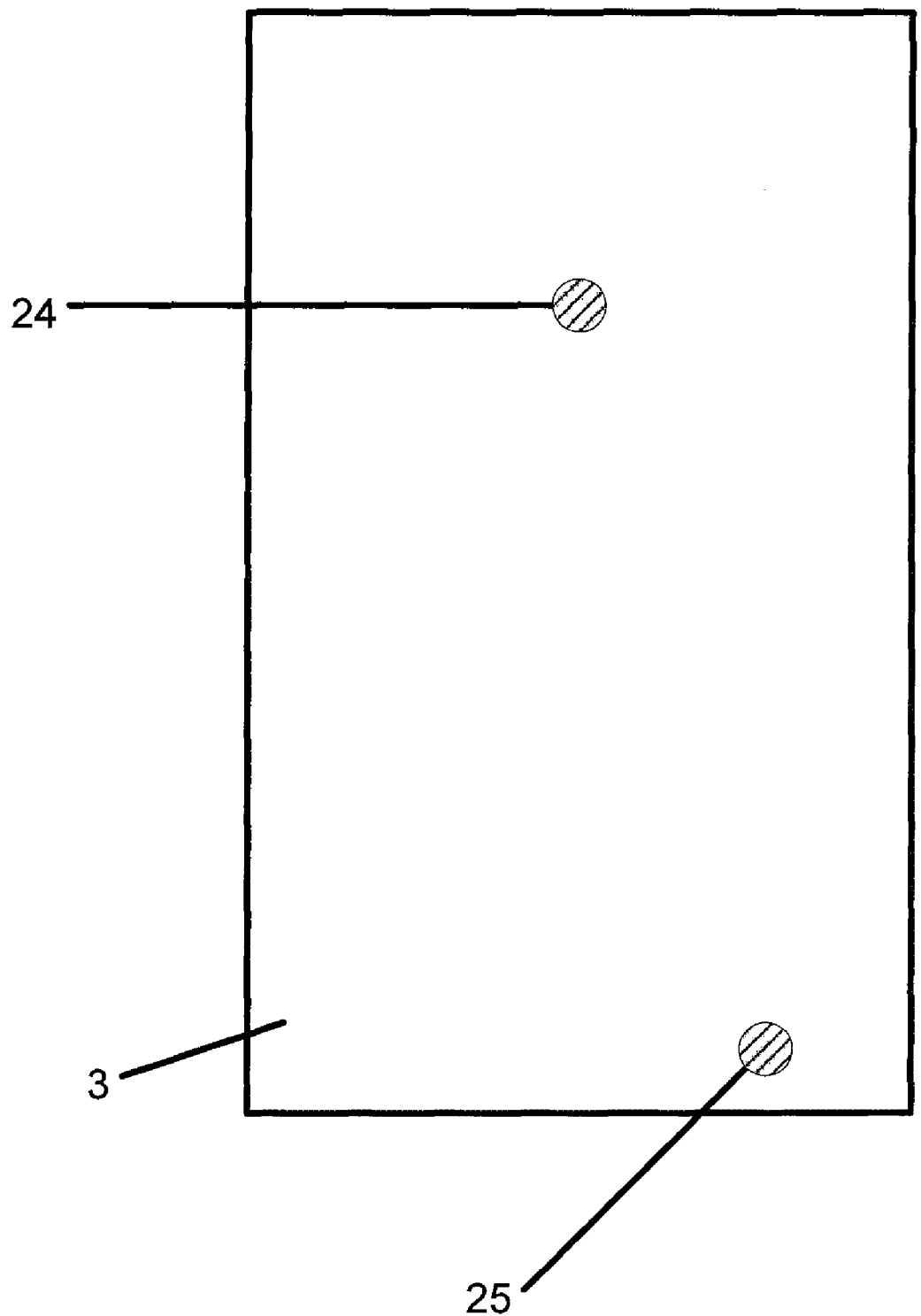
FIG. 3 is a back two-dimensional schematic view of the embodiment of FIG. 1 without the exterior safe 2.

Referring now to FIG. 3, the back of the preferred embodiment is described. An aperture 24 and an aperture 26 (FIG. 4) are utilized for anchoring the low security safe 3 to an external high security safe 2. Anchoring is accomplished by bolts that pass through each of the apertures 24 and 26 and screw into threaded apertures in the external high security safe 2. Alternatively, low security safe 3 may be anchored to high security safe 2 by welding or other well known manners for attaching two metallic objects to one another. A separate aperture 25 provides entry into the interior of low security safe 3 for electrical power and data communications lines to the processor 31 and power supply 32. In turn, access from outside high security safe 2 to the interior of high security safe 2 and the exterior of low security safe 3 is provided by alarm aperture 1. In alternative embodiments data communication between processor 31 and an outside network is accomplished via a wireless link as is well known in the art.

Figure 4:
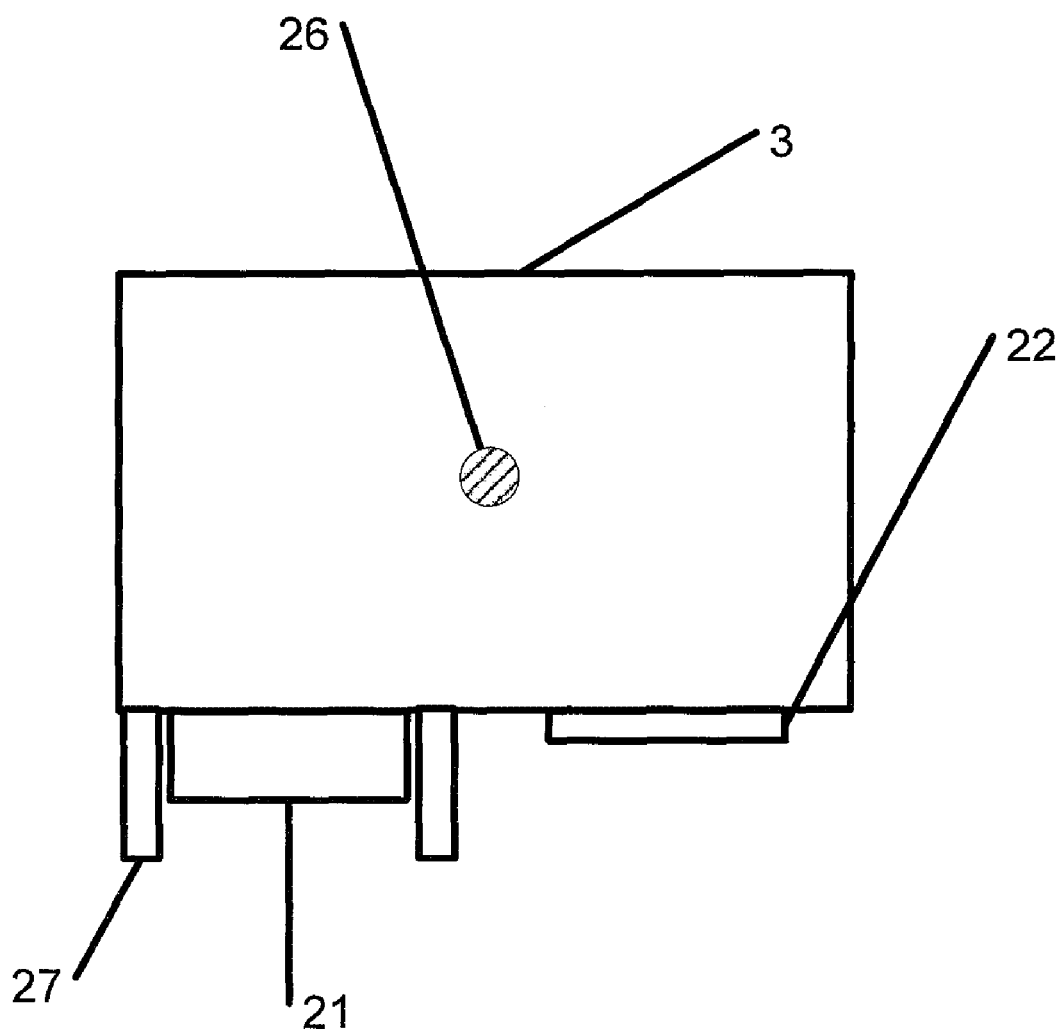
FIG. 4 is a bottom two-dimensional schematic view of the embodiment of FIG. 1 without the exterior safe 2.

Referring now to FIG. 4, the bottom of the preferred embodiment is described. Aperture 26 is used to anchor low security safe 3 to high security safe 2 as described in relation to FIG. 3. Currency note intake device head 21 and the currency note dispense device head 22 protrude from openings 9 and 7, respectively, so they are accessible while doors 6 and 8, respectively, remain closed and locked. Guards 27 are attached to and protrude from door 6 to provide physical protection for currency note intake device 21.

Figure 5:
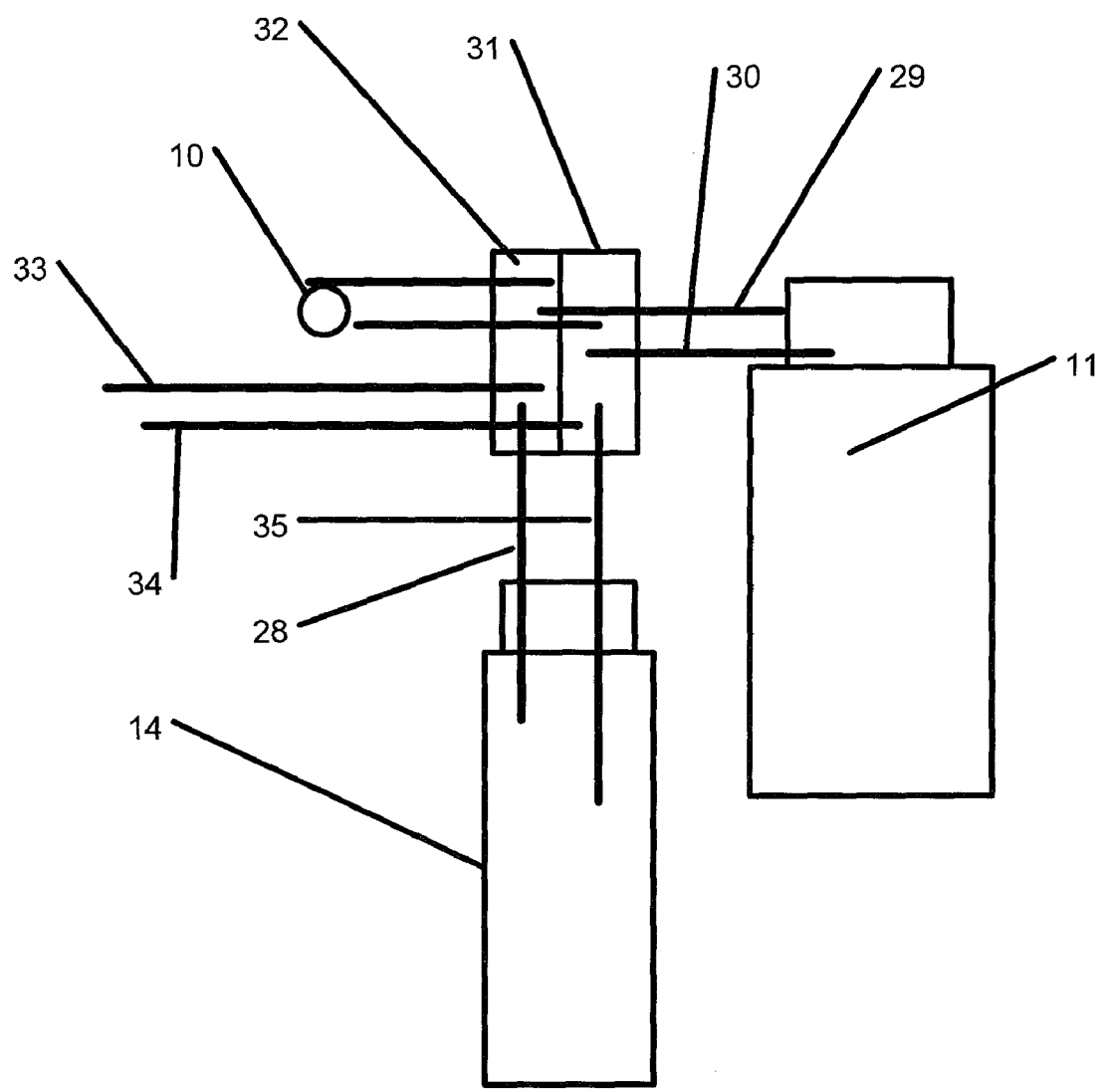
FIG. 5 is a schematic diagram showing the preferred internal data and electrical connections of the embodiment of FIG. 1.

Referring now to FIG. 5, the internal data and electrical connections for the preferred embodiment of the present invention are described. The cash dispensing device 11 is connected to power supply 32 via power connection 29. Power connection 29 is an insulation-coated wire, as is well known in the art, but may be any device for transmitting electrical power, for example microwaves. The cash dispensing device 11 is also connected to processor 31 via data connection 30 through a serial port, parallel port, USB or Ethernet communication cable. Data connection 30 permits communication between processor 31 and cash dispensing device 11, for the purposes of transmitting control signals to cash dispensing device 11 and for transmitting report signals to processor 31. Such signal transmission and processing is well known, and is not further discussed. Control signals are used to command cash dispensing device 11 to dispense specific amounts of cash at a specified time, or to a specified individual. For example, processor 31 sends a control signal to cash dispensing device 11 to dispense ten (10) ten-dollar bills, ten (10) five-dollar bills and fifty (50) one-dollar bills to a specific cashier. The cashier enters identifying information into cash dispensing device 11, by entering a personal identification number or biometric data such as a fingerprint or retinal scan, as is known in the art. In response to the control signal from processor 31 and the identifying information from the cashier, cash dispensing device 11 dispenses ten (10) ten-dollar bills, ten (10) five-dollar bills and fifty (50) one-dollar bills.

Similarly, the cash handling device 14 is connected to power supply 32 via power connection 28, which resembles power connection 29. The cash handling device 14 is also connected to processor 31 via data connection 35, which resembles data connection 30. Data connection 35 permits communication between processor 31 and cash handling device 14 for the purposes of transmitting control signals to cash handling device 14, and for transmitting report signals to processor 31. In certain embodiments, cash handling device 14 is a note recycler, as is well known in the art. In these embodiments, cash handling device 14 may also serve as a cash dispensing device, thus increasing the cash management system's ability to receive and disburse cash without loading cash into the system.

In the preferred embodiment, the processor 31 and the power supply 32 also control the locking and unlocking of the three locks 10. For simplicity, only one lock 10 and its connection to processor 31 and power supply 32 are depicted, but it is well understood that separate connections to the remaining two locks 10 are performed in a similar manner. Connecting processor 31 to each of the locks 10 permits remote signals to unlock a specific lock, thereby opening only one of chambers 4a, 6a or 8a at a time.

Figure 6:
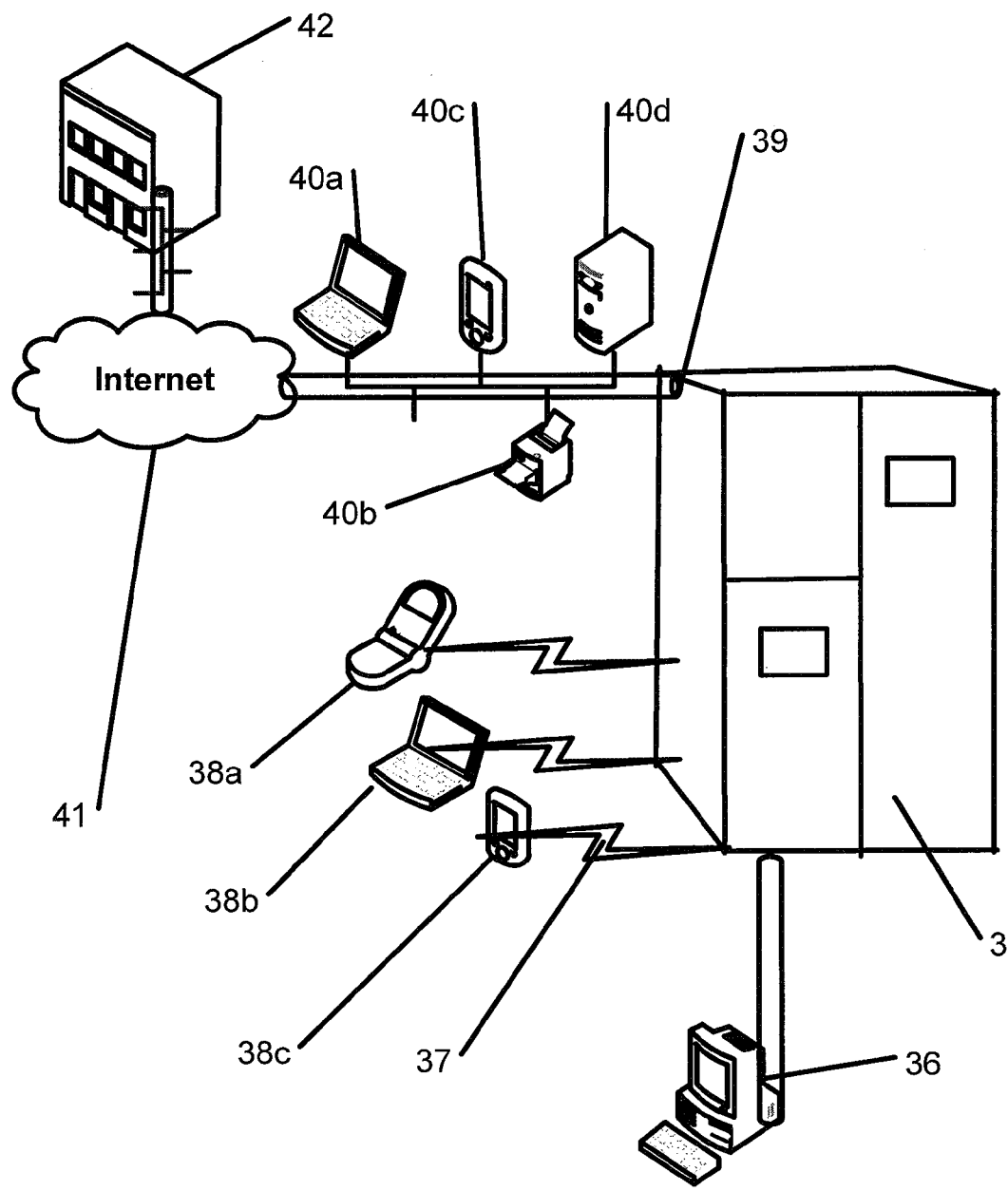
FIG. 6 is a schematic diagram showing an embodiment of the invention with a single installation in a network configuration.

An external networking cable 34 connects the processor 31 to an external network 39 (FIG. 6). Networking cable 34 can be an Ethernet connection, LAN, or other well-known network connection. The external network may be a private network, the World Wide Web or other network permitting communication between a remote location and one or more cash management devices according to the present invention. Power supply 32 is connected to an external power source, for example, a standard wall outlet, by power cable 33.

Referring now to FIG. 6, a schematic diagram of a single installation of a cash management device according to the present invention in a network configuration is described. Processor 31 can be locally connected to a computer 40a, printer 40b, personal digital assistant (PDA) 40c, or server 40d through an Ethernet or other wired communication cable 39 (for example, a serial, parallel, or USB connection) for the purpose of controlling dispensing or counting of cash and reporting. Operation and control of processor 31 is described in relation to FIG. 8 below.

In addition, processor 31 can also communicate via a wireless network 37 with a telephone 38a, computer 38b or other electronic device such as a personal digital assistant 38c for the purpose of controlling, dispensing or counting of cash and reporting. In the case of a telephone, communication is through key prompts and voice commands, as is well known in the art. Processor 31 can also be controlled remotely via the Internet 41 from a disparate location 42 for the purpose of controlling dispensing or counting of cash and reporting. In addition, the processor 31 communicates with a point of sale system (POS) 36 via Ethernet or wired communication cable (serial, parallel, USB) for the purpose of controlling dispensing, or counting of cash and reporting.

Figure 7:
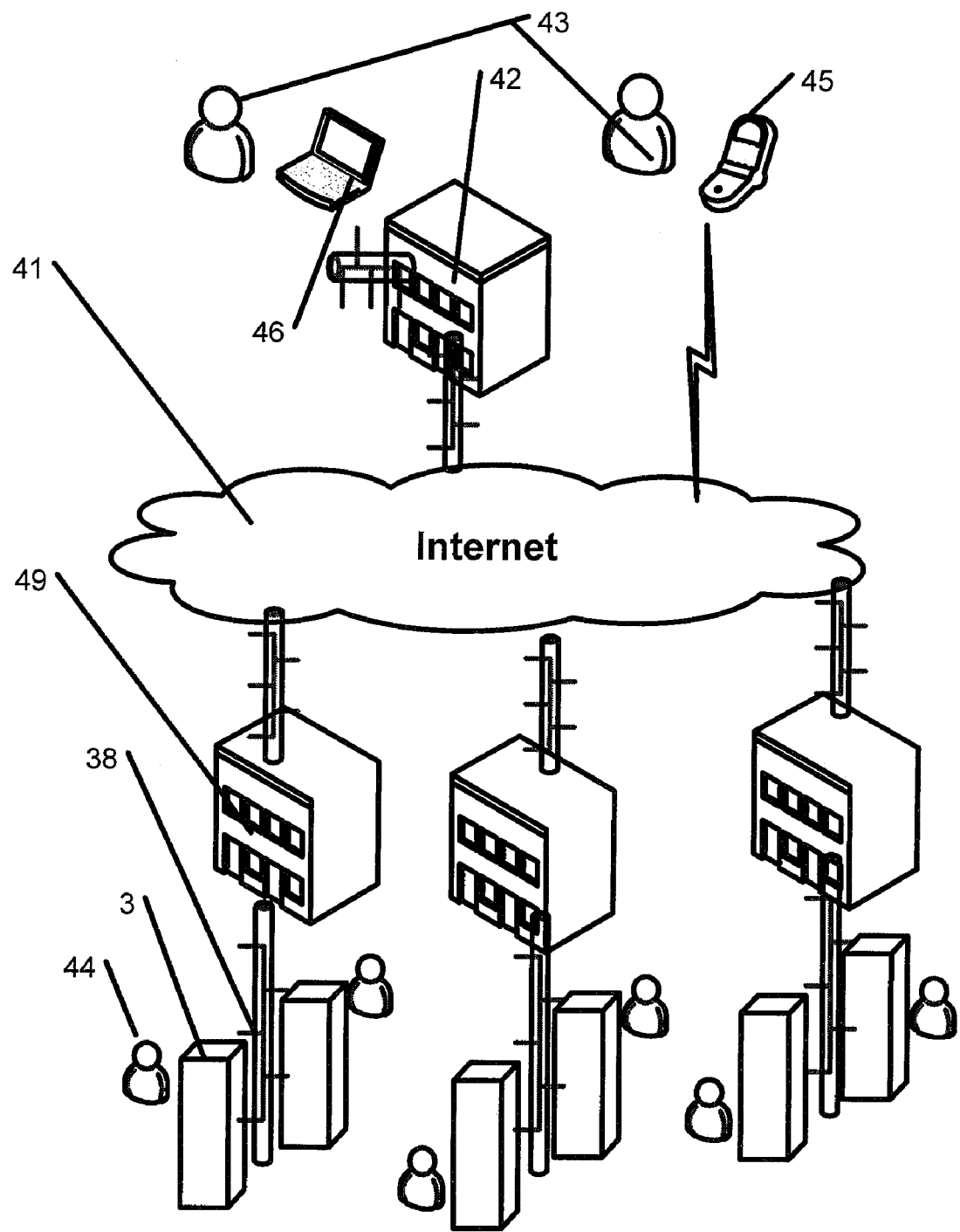
FIG. 7 is a schematic diagram showing an embodiment of the invention with multiple installations in a network configuration.

Referring now to FIG. 7, a schematic diagram of multiple installations of cash management devices according to the present invention in a network configuration is described. A single store location 49 can have multiple installations of low security safe 3 with its internal components as described above. Each of the installations of low security safe 3 is connected to an Ethernet network or other local area network 39 that is connected to the Internet 41. A manager (off-site user) 43 can connect to all of the installations of low security safes 3 from a single remote location 42, for example, through a computer 46 or through a telephone 45. The manager 43 can dispense and count cash from each of the cashiers (on-site user) 44 at all of the store locations 49 simultaneously and in real time. In addition, the manager 43 can access real time reporting information from all of the low security safes 3.

Figure 8:
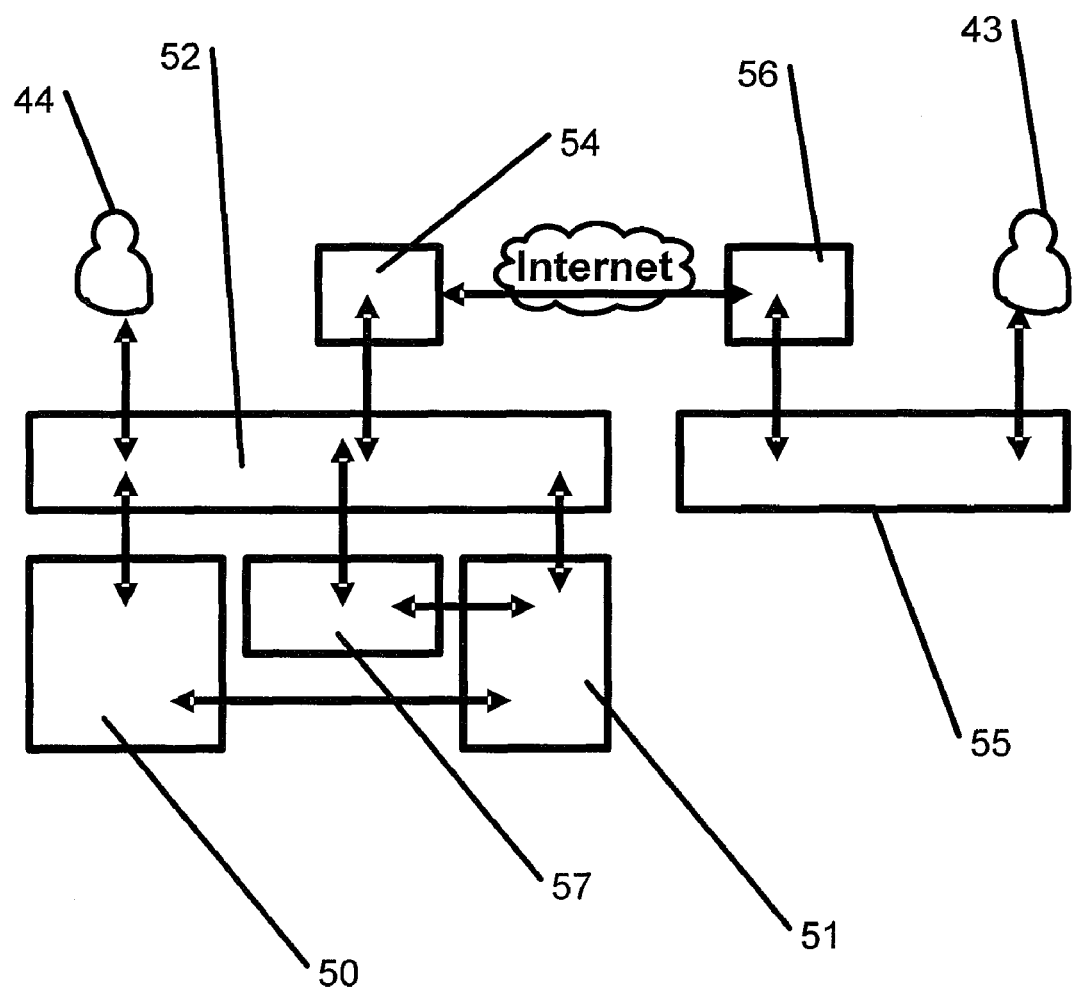
FIG. 8 is a schematic diagram showing the preferred embodiment of software architecture for the present invention.

Referring now to FIG. 8, processor 31 controls for the cash handling device 14 and cash dispensing device 11 by a remote or local user is described. An on-site user 44 (FIG. 7) communicates with the cash dispensing device 11 and with the cash handling device 14 through on-sight user interface software 52. The on-site user interface software 52 operates on an on-site computer 40a, 38b, server 40d, or POS 36, which is operationally connected through a wired connection 39 (FIG. 7) or wireless connection 37 to the processor 31. The on-site user interface software 52 accepts commands, for example to dispense $500 in a particular denomination, to count cash, to deposit cash, and to show audit reports.

In the event that the on-site user interface software 52 operates on a POS 36, the on-site user interface software 52 is part of the POS interface for the on-site user 44. The on-site user 44 could open a starting cash drawer balance and dispense cash with one command on the POS interface. The command opens a cash drawer balance account in the POS software and causes the cash dispensing device 11 to dispense the cash (as described in the following paragraph). Likewise, the on-site user 44 could close a cash drawer balance and count cash with one command on the POS interface. The command closes a cash drawer balance account in the POS software and prompts the teller to place the closing cash into the cash counting device 14 for counting and deposit (as described in the following paragraph). The closing cash count is reconciled with the sales transaction data stored in the POS to determine whether the on-site user's 44 drawer was short cash at the end of a shift. Sales data, as well as amounts of cash withdrawn and deposited, are correlated to a particular cashier when the cashier makes an identification to the cash management system. This identification may be through the on-site user interface software 52, for example by entering a PIN or password, as is well known in the art. In other embodiments, the cashier identification is made directly to the cash management system which is equipped with a biometric evaluation device, such as a fingerprint scanner, retinal scanner, etc. The algorithm for reconciling cash on hand against sales data to determine whether a cashier is short of cash is a well known accounting principle and is not further described.

The on-site user interface software 52 allows control of three subsystem software modules. A software module 50 allows control of the cash dispensing device 11 and a software module 57 allows control of the cash handling device 14. Both software modules 50 and 57 utilize a software program that interprets data between the cash handling hardware and the user interface 52.

These modules overcome the difficulty of integrating multiple pieces of hardware (which communicate in different protocols) with one user interface. A user, through the on-site user interface software 52, sends a command in a standard protocol to dispense cash. Software module 50 converts the standard protocol command into a non-standard protocol that is understandable by the cash dispensing device 11, and vice versa. For example, on-site user interface software 52 sends a cash dispense command in standard application program interface protocol (API) to module 50 which converts the command to hexadecimal, binary or other software language protocol recognized by the cash dispensing device 11. In response, cash dispensing device 11 dispenses the requested cash. Similarly, cash handling device 14 sends a data signal indicating the amount of cash counted to the on-site user interface software 52 via software module 57.

The non-standard communication data are communication protocols that are unique to the manufacturer of the cash dispensing device 11 or the cash handling device 14. Software modules 50, 57 and 51 are designed to recognize protocols from various cash dispensing and cash handling device manufacturers, and to convert signals from those protocols into the standard interfaces, such as COM, ActiveX or other widely available program interfaces utilized by the on-site user interface software 52. A software module 51 continuously captures and stores event data from both software module 50 and 57 for real-time audit and reporting purposes. Data from software module 50 is used to generate real-time reports and audits when requested by an off-site or local manager. Software modules 51, 57, and 50 operate on the on-site computer 40a, 38b, server 40d, POS 36, or processor 31.

Other cash handling hardware can be substituted for cash dispensing device 11 and cash handling device 14 and immediately interfaced with the user interface 52. Because software modules 50, 57, and 51 are programmed to recognize protocols from various manufacturers, the present invention permits rapid, easy exchange between various hardware components without interrupting the functional data flow necessary for cash dispensing, counting, reporting, and auditing.

The off-site user 43 (FIG. 7) is able, in real time, to remotely control the cash disbursing device 11 and cash handling device 14 by the off-site user interface software module 55 that operates on computer 46 or telephone 45. An off-site messaging software module 56 that operates on the same device as the off-site user interface software module 55 converts the off-site user's 43 commands to dispense cash, accept cash, or audit into a standard XML messaging protocol. For example, the XML message could contain the amount of cash to dispense or a request to send an audit report. That XML messaging or other standard commercial protocol is transmitted through the Internet 41 to an on-site messaging software module 54. The transmission through the Internet is done in a secure manner using secure socket layer (SSL) or other commercially available encryption technology. The on-site messaging software module 54 converts the XML messaging or other standard commercial protocol instructions into commands for the on-site user interface software 52. In turn, the on-site user interface software 52 instructs software modules 51, 57 and 50 to carry out the commands from the off-site user 43 contained in the original XML message.

The on-site interface software module 52 can also initiate a communication with the off-site user interface software module 55 in the case that a user programmed event occurs, such as door 4, 6, 8 (FIG. 1) opening or a low cash or jam event from the cash handling devices. In real-time, the on-site interface software module 52 instructs the on-site software messaging module 54 to send an alert to the off-site user interface software module 55. This is accomplished by the same method as described above, through a secure Internet connection.

Figure 9:
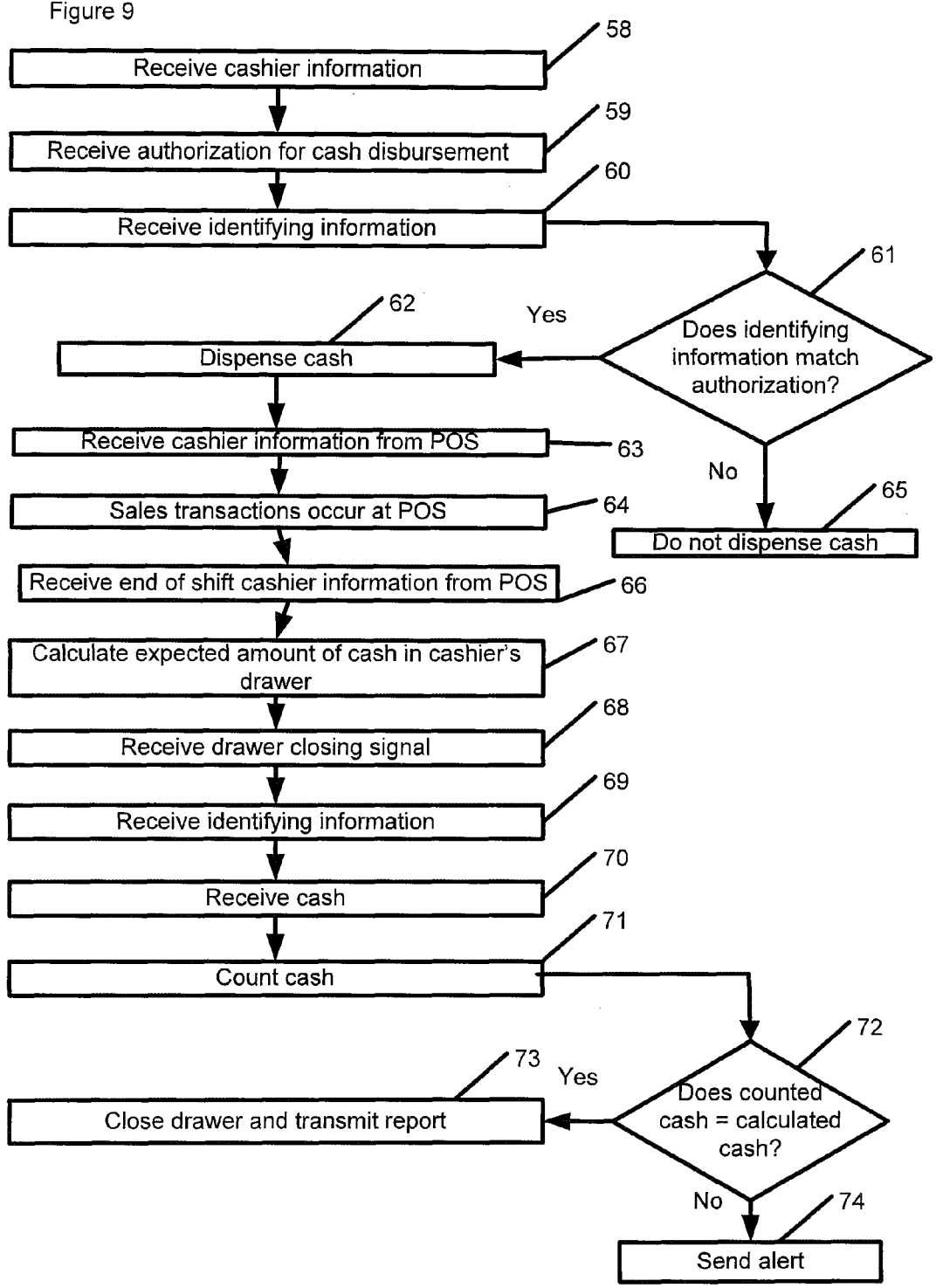
FIG. 9 is a process flow of a method according to an embodiment of the present invention.

Referring now to FIG. 9, a method for automatically balancing a cash drawer is described. Before a cash management system can be used to balance a cashier's drawer the cash management system must be able to recognize a cashier so that it may correlate certain data with a specific cashier. At step 58, a cash management system receives cashier identifying information. For example, cashier identifying information may be a personal identification number assigned to a particular cashier, the cashier's name and an associated password, biometric data, for example, a fingerprint, or any combination of these or other identifying information.

An authorization signal is sent to the cash management system at step 59. In the preferred embodiment, the authorization signal contains terms such as information identifying the authorizer, information identifying a particular cashier and the amount of cash authorized to be disbursed to a particular cashier. The authorization signal may originate at the cash management system itself, for example by a manager or a cashier, or may originate remotely from the cash management system, for example, from a manager at a distant location sending a signal through the Internet as described above.

At step 60, the cash management system receives identifying information from the cashier, such as a personal identification number, etc. as described above. The cashier identifying information is compared to the authorization at step 61 to determine whether the identifying information matches the authorization. If the Page of identifying information does not match the authorization, then the method is terminated at step 65 and no cash is dispensed.

If the identifying information does match the authorization, then cash is dispensed at step 62 and the amount of cash dispensed is correlated to the cashier using the cashier identifying information. The cashier opens a drawer at a point of sales system. At step 63 the cash management system receives information from the point of sales system, such as the amount of cash used to open the drawer, or the cashier identifying information along with an identifier for the point of sales system. This permits the cash management system to create a record for the cashier that is tied to the point of sales system. Sales transactions are processed by the cashier through the POS system at step 64. Then, when the cash management system receives sales data from the point of sales system at step 66, the cash management system correlates the sales data to the cashier and the amount of cash dispensed to the cashier. In alternative embodiments, sales data is manually entered into the cash management system. For example, a cashier enters identifying information into the cash management system and then inputs sales data using a key pad attached to the cash management system. The sales data may be manually entered during a shift, for example, a cashier with too much cash in the drawer deposits some cash into the cash management system and at the same time enters sales data for the beginning of the shift to the point in time when the deposit is made. Sales data may also be manually entered at the end of a shift.

Based on the cash disbursed to the cashier, and the sales data from the cashier's point of sales system, the cash management system calculates how much cash is in the cashier's drawer at step 67. Even if steps 59 through 62 are repeated, the cash management system knows how much cash the cashier has.

When the cashier's shift ends and the cashier logs out of, turns off, etc. the point of sales system, the cash management system receives a signal from the point of sales system that the cashier is closing the drawer at step 68. The cash management system is now prepared to receive identifying information from the cashier at step 69 and receive cash at step 70. By using the cashier identifying information again, the cash management system correlates the received cash to the cashier when it counts the cash at step 71.

At step 72, the cash management system compares the counted cash to the calculated cash for the cashier. If the counted cash does not match the calculated cash, an alarm signal is sent from the cash management system at step 74. For example, the alarm signal is sent from the cash management system to a remote manager via the Internet, or over a wireless telephone system. If the counted cash matches the calculated cash at step 72, then the cash management system closes the cashier's drawer and sends a closing report at step 73.

Additionally, the above-described method for automatically balancing a cashier's drawer, utilized with the cash management system described above, has the advantage over related art that cash is ready and available for disbursement the next time a cashier needs cash, without requiring a manager to transfer cash from one safe to another and without requiring daily cash drop-off and pick-up by a bank or armored car service.

While this invention has been described in connection with what is presently considered to be the most practical and preferred embodiment, it is to be understood that the invention is not limited to the described embodiments, but, on the contrary, is intended to cover various modifications and equivalent arrangements included within the scope of the appended claims.

What is claimed is:

1. An apparatus for managing cash comprising: (a) a high security safe having a door, said high security safe having an aperture through a safe wall; (b) an inner safe with a first internal compartment, a second internal compartment, and a third internal compartment, said inner safe configured to fit within said high security safe; (c) a first door preventing access to said first compartment when closed and providing access to said first compartment when open; (d) a second door preventing access to said second compartment when closed and providing access to said second compartment when open, said second door having an aperture that allows communication between said second compartment and the outside of said inner safe when said second door is closed; (e) a third door preventing access to said third compartment when closed and providing access to said third compartment when open, said third door having an aperture that allows communication between said third compartment and the outside of said inner safe when said third door is closed; (f) a first lock for locking said first door; (g) a second lock for locking said second door; (h) a third lock for locking said third door; (i) a processor contained within said first compartment having a data connection for communicating with a computer external to said high security safe, said data connection passing through said aperture in said safe wall of said high security safe; (j) a power supply contained within said first compartment having a power connection that passes through said aperture in said safe (k) a cash handling device mounted in said second compartment, said cash handling device connected to said power supply and to said processor and mounted to have a portion protrude through said aperture in said second door when said second door is closed; (l) a cash dispensing device contained in said third compartment, said cash dispensing device comprising a dispensing head connected to said power supply and to said processor and configured to have said dispensing head protrude through said aperture in said third door when said third door is closed, said dispensing head being removable through said aperture in said third door without opening said third door; and (m) a moveable shelf in said third compartment configured to move to a position that permits said dispensing head of said cash dispensing device to protrude through said aperture in said third door when said third door is closed.

2. The apparatus according to claim 1, wherein said inner safe is attached to said high security safe.

3. The apparatus according to claim 1, further comprising:
(a) a first sensor connected to said processor for sensing whether said first door is open or closed;
(b) a second sensor connected to said processor for sensing whether said second door is open or closed;
(c) a third sensor connected to said processor for sensing whether said third door is open or closed; and
(d) said first lock, said second lock, and said third lock being electronic locks connected to said processor and being locked or unlocked by signals from said processor.

4. The apparatus according to claim 1, wherein said apparatus is an on-site cash management system at least partially controllable from an off-site location distant from where said cash management system is located.

5. The apparatus according to claim 1, wherein said apparatus is an on-site cash management system in which at least one of said high security safe door and the inner safe doors is controllable from an off-site location distant from where said cash management system is located.

6. The apparatus according to claim 1, wherein said apparatus is an on-site cash management system in which at least one of said cash handling device and said cash dispensing device is controllable from an off-site location distant from where said cash management system is located.

7. The apparatus according to claim 1, wherein said apparatus is an on-site cash management system for dispensing an amount of cash to a cashier.

8. The apparatus according to claim 7, further comprising:
(a) means for receiving into said cash management system cashier identifying information from a trusted source; and
(b) means receiving into said cash management system cashier identifying information from the cashier before dispensing the amount of cash.

9. The apparatus according to claim 1, wherein said aperture in said safe wall of said high security safe is consistent with an underwriter high security rating of TL-15 or better.

10. The apparatus according to claim 1, wherein said data connection is an Ethernet data connection.

11. An apparatus for managing cash comprising: (a) a high security safe having a door, said high security safe having an aperture through a safe wall, said aperture consistent with an underwriter high security rating of TL-15 or better; (b) an inner safe having a plurality of internal compartments, said inner safe configured to fit within said high security safe; (c) a plurality of doors, each door associated with a respective internal compartment, each door preventing access to its respective compartment when closed and providing access to its respective compartment when open; (d) a cash handling device positioned within one of said compartments such that at least a portion of said cash handling device protrudes through an aperture in the respective door when the respective door is closed; and (e) a cash dispensing device positioned within one of said compartments such that at least a dispensing head of said cash dispensing device protrudes through an aperture in the respective door when the respective door is closed, said dispensing head being removable through said aperture in said respective door without opening said respective door; (f) a moveable shelf in said third compartment configured to move to a position that permits said dispensing head of said cash dispensing device to protrude through said aperture said respective door is closed.

12. The apparatus according to claim 11, further comprising:
(a) a processor having a data connection for communicating with a computer external to said high security safe, said processor positioned within one of said compartments; and
(b) said data connection passing through the aperture in said safe wall of said high security safe and attached to said computer external to said high security safe.

13. The apparatus according to claim 11, further comprising:
(a) a processor having an Ethernet data connection for communicating with a computer external to said high security safe, said processor positioned within one of said compartments; and
(b) said Ethernet data connection passing through the aperture in said safe wall of said high security safe and attaching to said computer external to said high security safe.

14. The apparatus according to claim 11, further comprising:
(a) a first sensor connected to said processor for sensing whether said first door is open or closed;
(b) a second sensor connected to said processor for sensing whether said second door is open or closed;
(c) a third sensor connected to said processor for sensing whether said third door is open or closed; and
(d) said first lock, said second lock, and said third lock being electronic locks connected to said processor and being locked or unlocked by signals from said processor.

15. The apparatus according to claim 11, further comprising:
(a) a processor having a data connection for communicating with a computer external to said high security safe, said processor positioned within one of said compartments;
(b) a power supply having a power connection, said power supply positioned within one of said compartments;
(c) said data connection and said power connection passing through the aperture in said safe wall of said high security safe; and
(d) said data connection attached to said computer external to said high security safe.

16. The apparatus according to claim 11, wherein said inner safe is attached to said high security safe.

17. The apparatus according to claim 11, wherein said apparatus is an on-site cash management system at least partially controllable from an off-site location distant from where said cash management system is located.

18. The apparatus according to claim 11, wherein said apparatus is an on-site cash management system in which at least one of said high security safe door and said inner safe doors is controllable from an off-site location distant from where said cash management system is located.

19. The apparatus according to claim 11, wherein said apparatus is an on-site cash management system in which at least one of said cash handling device and said cash dispensing device is controllable from an off-site location distant from where said cash management system is located.

20. The apparatus according to claim 11, wherein said apparatus is an on-site cash management system for dispensing an amount of cash to a cashier.

21. The apparatus according to claim 20, further comprising:
(a) means for receiving into said cash management system cashier identifying information from a trusted source; and
(b) means receiving into said cash management system cashier identifying information from the cashier before dispensing the amount of cash.

22. An apparatus for managing cash comprising: (a) a high security safe having a door, said high security safe having an aperture through a safe wall, said aperture consistent with an underwriter high security rating of TL-15 or better; (b) an inner safe having a plurality of internal compartments, said inner safe configured to fit within said high security safe; (c) a plurality of doors, each door associated with a respective internal compartment, each door preventing access to its respective compartment when closed and providing access to its respective compartment when open; (d) a processor having a data connection for communicating with a computer external to said high security safe, said processor positioned within one of said compartments; (e) a power supply having a power connection, said power supply positioned within one of said compartments; (f) said data connection and said power connection passing through the aperture in said safe wall of said high security safe; (g) said data connection attached to said computer external to said high security safe; (h) a cash handling device positioned within one of said compartments such that at least a portion of said cash handling device protrudes through an aperture in the respective door when the respective door is closed; and (i) a cash dispensing device positioned within one of said compartments such that at least a dispensing head of said cash dispensing device protrudes through an aperture in the respective door when the respective door is closed, said dispensing head being removable through said aperture in said respective door without opening said respective door (j) a moveable shelf in said third compartment configured to move to a position that permits said dispensing head of said cash dispensing device to protrude through said aperture said respective door is closed; (k) wherein said apparatus is an on-site cash management system at least partially controllable from an off-site location distant from where said cash management system is located.

23. The apparatus according to claim 22, further comprising:
(a) a first sensor connected to said processor for sensing whether said first door is open or closed;
(b) a second sensor connected to said processor for sensing whether said second door is open or closed;
(c) a third sensor connected to said processor for sensing whether said third door is open or closed; and
(d) said first lock, said second lock, and said third lock being electronic locks connected to said processor and being locked or unlocked by signals from said processor.

24. The apparatus according to claim 22, wherein said apparatus is an on-site cash management system in which at least one of said high security safe door and said inner safe doors is controllable from an off-site location distant from where said cash management system is located.

25. The apparatus according to claim 22, wherein said apparatus is an on-site cash management system in which at least one of said cash handling device and said cash dispensing device is controllable from an off-site location distant from where said cash management system is located.

26. The apparatus according to claim 22, wherein said apparatus is an on-site cash management system for dispensing an amount of cash to a cashier.

27. The apparatus according to claim 26, further comprising:
(a) means for receiving into said cash management system cashier identifying information from a trusted source; and
(b) means receiving into said cash management system cashier identifying information from the cashier before dispensing the amount of cash.

* * * * *